Oct. 31, 1944.  A. L. GRISÉ  2,361,685
HOSE NOZZLE
Filed Feb. 25, 1943
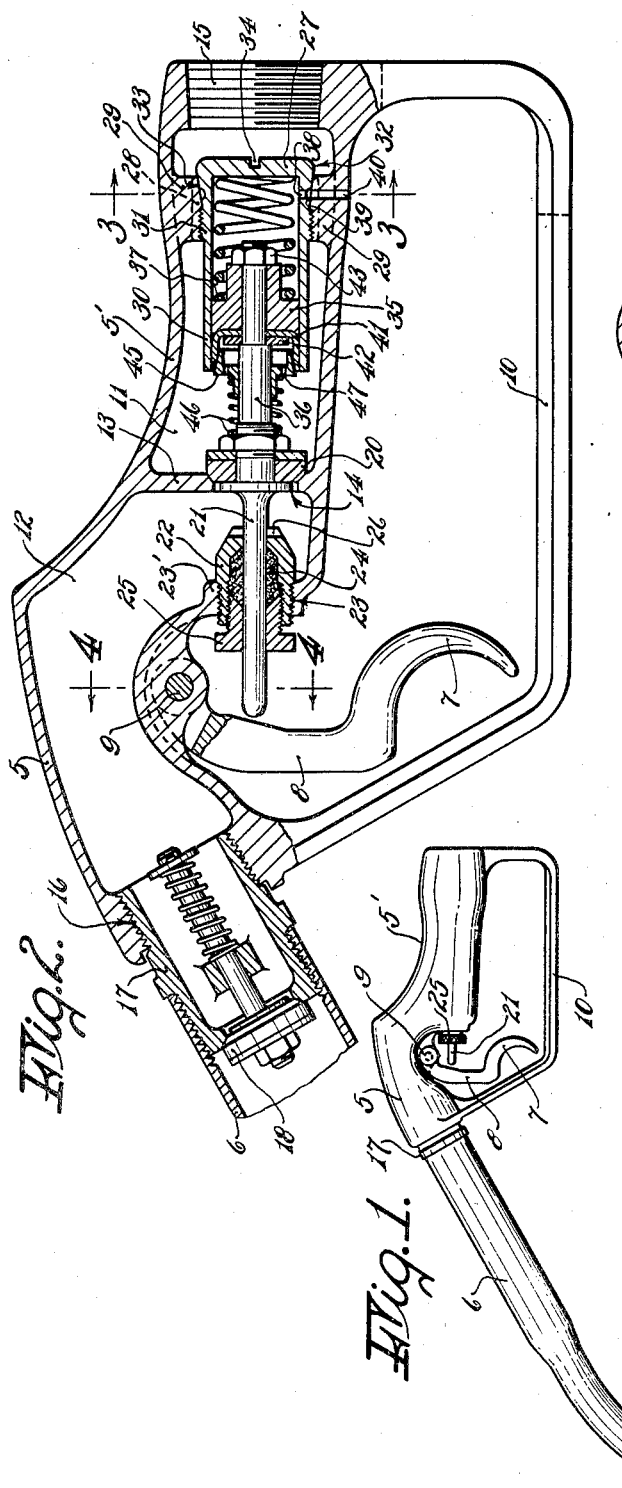
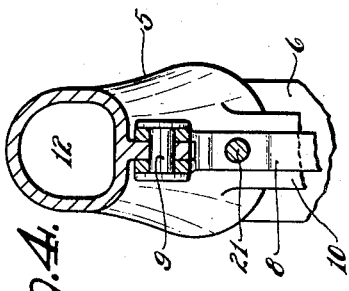
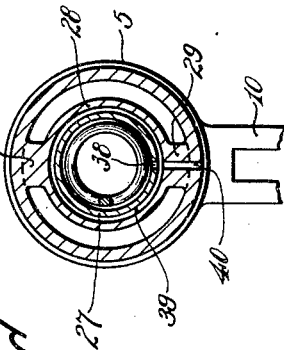
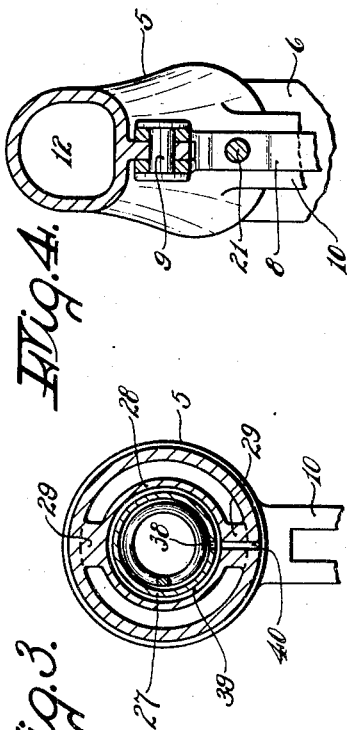
INVENTOR
ALFRED L. GRISÉ
BY
Chapin & Neal
ATTORNEYS Patented Oct. 31, 1944

2,361,685

UNITED STATES PATENT OFFICE 2,361,685

HOSE NOZZLE

Alfred L. Grisé, Springfield, Mass., assignor to Gilbert & Barker Manufacturing Company, Springfield, Mass., a corporation of Massachusetts Application February 25, 1943, Serial No. 477,037

4 Claims. (Cl. 251—134)

This invention relates to improvements in valved hose nozzles, such for example as are used at the delivery end of the hose of a gasoline dispensing pump.

One object of the invention is to provide in a hose nozzle a means for balancing the valve so that it may be operated easily by the usual hand lever and made to move smoothly over the entire range of its opening and closing movements.

Another object of the invention is to provide a hose nozzle having an improved arrangement of parts enabling the nozzle to be streamlined—the arrangement being characterized in that the inlet and outlet passages of the nozzle are arranged end to end without any overlapping and in that the nozzle valve, its stem, the balancing piston and the inlet passage are in coaxial relation.

Another object of the invention is to provide an improved construction and mounting of the nozzle valve, and the balancing means and the actuating means therefor, to enable all machining operations to be performed from the inlet end of the nozzle.

The invention will be disclosed with reference to the accompanying drawing in which:

Fig. 1 is a small-scale exterior elevational view of a hose nozzle embodying the invention;

Fig. 2 is a fragmentary sectional elevational view thereof; and

Figs. 3 and 4 are cross sectional views taken on the lines 3—3 and 4—4, respectively, of Fig. 2.

Referring to the drawing, the nozzle comprises a body 5 usually of cast metal and a long tubular spout 6, suitably attached thereto. The body 5 is shaped to provide a portion 5' to be grasped by the hand of the operator so that he can conveniently reach with a finger the trigger portion 7 of a valve actuating lever 8, pivoted at 9 to the body 5. A guard 10, formed integrally with body 5, is provided for the lever 8.

Referring now to Fig. 2, the body 5 is hollow and is provided with inlet and outlet passages 11 and 12, respectively, arranged end to end and separated by a partition 13 having an opening 14 therethrough. An entrance opening 15 is provided to the passage 11 and such opening is usually threaded, as indicated, for attachment to the hose of the dispensing pump. An exit opening 16 is provided for passage 12 and into this opening is screwed the casing 17 of a check valve 18. The spout 6 is screwed onto the casing 17. The check valve is not an essential part of this invention and it has been shown merely because it is usually used in the hose nozzles of gasoline dispensing pumps. This valve is usually set to open at a very low pressure, say three pounds.

The opening 14 is controlled by a valve 20, suitably fixed as indicated to a stem 21 which extends outwardly from the casing through a stuffing box for actuation in one direction (to the right) by the lever 8. The stuffing box is formed in a casing 22 screwed into a threaded opening 23 in a wall 23' of the body 5. The outlet passage 12 is bent out of line with the inlet passage to form this wall 23' which is in spaced parallel relation with partition 13. This casing 22 contains packing 24 which is forced against stem 21 by the gland 25, threaded into the casing 22. This casing is of a diameter such that it will pass through hole 14 and it has a screw driver slot 26 to enable it to be screwed in place, working from the inlet end of body 5 through the hole 15. The holes 15, 14 and 23 are coaxial and they are progressively smaller in diameter in the order named.

The valve balancing means is contained within a casing 27 secured in a hub 28 integrally connected by spider arms 29 to the body 5. This casing has a front portion 30 of cylindrical form extending from the hub 28 toward the valve and having an open end confronting the valve. This casing also has a threaded portion 31 of slightly larger diameter engaged in a threaded hole in hub 28. The rear portion of the casing 27 is of frustoconical form and has a tapered surface 32 adapted to engage a similarly tapered surface 33 in the hub. The rear end of the casing 27 is closed and in the rear wall is a screw driver slot 34, whereby the casing may be turned in order to screw it into place in the hub 28. The tapered portion of the casing 27 is drawn tightly into the tapered hole in the hub to make a liquid tight joint therebetween for a reason later to appear.

The interior of casing 27 forms a cylinder to slidably receive a piston 35 on a rod-like extension 36 of the stem of valve 21. In the rear (right hand) end of the cylinder is a spring 37 for closing valve 20. The rear end of the cylinder is in communication with the atmosphere by way of a radial hole 38 therein, opening into a circumferential groove 39, formed in the tapered part 32 of casing 27, and a hole 40 in one of the spider arms 29. The tightly coacting surfaces 32 and 33 prevent the liquid, which is under substantial pressure, in passage 11 from escaping into hole 40.

The piston 35 has a cup leather 41. This is clamped between a washer 42 and the body of the piston by a nut 43 which forces the body against the leather, the leather against the washer, and the washer against a shoulder on rod 36.

In order to insure a tight fit between the piston cup leather 41 and the cylinder wall, a frusto-conical spreader 45 is slidably mounted on rod 36 and urged by a spring 46 into engagement with the inner peripheral part of the cup leather. The passage 11 is normally filled with liquid and the pressure may reach a value as high as 15 lbs. per square inch. It is important therefore that leakage from this chamber be prevented. Thus, the tapered-plug spreader 45 helps in preventing liquid from passing the piston and entering the rear end of the cylinder from which it could escape by way of holes 38 and 40. Vent holes 47 are provided through the face of member 45 so that liquid pressure will act equally on opposite sides thereof, leaving the spring 46 as the only means acting to move the spreader into the cup leather. Without these vents, the liquid pressure might drive the spreader into the leather to such a degree as to jam the piston in its cylinder.

In manufacturing the nozzle, most of the work can be done with a single set up of the nozzle, working from the inlet (right hand) end thereof. The hole 15 can be tapped. Working through hole 15, the hole in hub 28 can be drilled, then the front end of this hole can be tapped to receive the threaded part 31 and then the rear end of the hole can be reamed out with a tapered reamer to form the surface 33. Then, working through the above two holes the valve seat surrounding hole 14 can be finished and the hole 23 tapped. With these operations performed, the stuffing box casing 22 is inserted successively through the holes 15, 33 and 14 and screwed into hole 23, using a screw driver inserted through said holes and engaged in slot 26. Then, the valve 20, previously assembled on its stem 21 and having the piston 35 secured in place on rod 36, is inserted through holes 15 and 33 and the stem passed through hole 14 and casing 22. The packing 24 may then be put in place and the gland 25 screwed into position. Then, the cylinder 28 is passed through hole 15 and its forward end slipped over the piston, after which the cylinder is screwed tightly into the illustrated position. All this work may be done in a convenient and simple way from the inlet end of body 5. The only other work on the body is to drill hole 40, tap the hole 16 and drill for the pivot pin 9. The construction is such as to afford distinct advantages in manufacture with resultant savings in cost.

In operation, the valve 20 can be moved readily from its seat by a finger engaged with the trigger 7 because it is approximately balanced with respect to liquid pressure. The pressure acting on the inner face of valve 20 and tending to hold it on its seat is approximately balanced by the pressure acting on the left hand face of piston 35 and tending to open the valve. The other side of piston 35 is exposed to atmospheric pressure and the total pressure here is balanced by the somewhat larger unit pressure in passage 12 acting on the somewhat smaller outer face of valve 20. Liquid pressure, as a factor in controlling the operation of valve 20, is substantially eliminated and only the force of spring 37 has to be overcome. As a result, the valve can be opened relatively easy and it can be moved relatively smoothly and easily from closed to fully open position and back again without difficulty. The hammer action and chattering of the valve, heretofore occurring when one tries to throttle down the valve as low as possible to give a trickling flow, is avoided.

The construction enables a nozzle of streamlined form to be provided. The passages 11 and 12 are disposed end to end and nearly in line and offset only insofar as is necessary for the lever to act on valve stem 21. The axis of the valve and its balancing piston are disposed generally lengthwise of the body 5 instead of crosswise thereof, and it is exactly alined with the inlet 15 and inlet passage 11. A saving in weight can be effected as well as savings in manufacture due to the improved construction and arrangement of parts and the nozzle is made of more pleasing appearance.

What I claim is:

1. A hose nozzle, comprising, a hollow body having inlet and outlet passages arranged end to end and separated by a partition, said outlet passage being bent out of line with the inlet passage to provide a wall in spaced parallel relation with the partition, a hub in the inlet passage supported by spider arms from the wall thereof; said body having four openings therein all in coaxial relation with the inlet passage and of progressively decreasing diameter in the order named, namely, a first opening forming an entrance to the inlet passage, a second opening in said hub, a third opening in said partition and a fourth opening in said wall; a stuffing box in the outlet passage and mounted in the fourth opening, a valve in the inlet passage to coact with the third opening and having an actuating stem passing through the stuffing box and outside the body, a cylinder fixed in the second opening and having a closed end near the entrance opening and an open end near and facing the valve, a piston in said cylinder, a rod for the piston fixed to said valve, a spring in the closed end of the cylinder for moving the piston outwardly in its cylinder and the valve to its seat, the stuffing box being less in diameter than the first, second and third openings, the valve being less in diameter than the first and second openings and the cylinder being less in diameter than the first opening, whereby the stuffing box, valve and cylinder may be assembled in the order named through said entrance opening, and an actuating lever pivoted to said body for engaging said stem to open the valve.

2. A hose nozzle, comprising, a hollow body having inlet and outlet passages arranged end to end and separated by a partition, said outlet passage being bent out of line with the inlet passage to provide a wall in spaced parallel relation with the partition, a hub in the inlet passage supported by spider arms from the wall thereof; said body having four openings therein all in coaxial relation with the inlet passage and of progressively decreasing diameter in the order named, namely, a first opening forming an entrance to the inlet passage, a second opening in said hub, a third opening in said partition and a fourth opening in said wall; a stuffing box in the outlet passage and mounted in the fourth opening, a valve in the inlet passage to coact with the third opening and having an actuating stem passing through the stuffing box and outside the body, a cylinder fixed in the second opening and having a closed end near the entrance opening and an open end near and facing the valve, a piston in said cylinder, a rod for the piston fixed to said valve, a spring in the closed end of the cylinder for moving the piston outwardly in its cylinder and the valve to its seat, the stuffing box being less in diameter than the first, second and third openings, the valve being less in diameter than the first and second openings and the cylinder being less in diameter than the first opening, whereby the stuffing box, valve and cylinder may be assembled in the order named through said entrance opening, and an actuating lever pivoted to said body for engaging said stem to open the valve, said body having an opening leading from the atmosphere through one of said spider arms and cylinder into the latter at a point between the piston and closed end of the cylinder.

3. In a hose nozzle, having inlet and outlet passages separated by a partition located normal to the axis of the inlet passage and having an opening, a valve located in the inlet passage for closing said opening and having an actuating stem extending into the outlet passage and outside said body, a lever outside and pivoted to the body for actuating said stem, a cylinder fixed in the inlet passage coaxially thereof and spaced from the walls thereof for the passage of liquid therearound, said cylinder having the end nearest the entrance to the inlet passage closed and the other end open and being coaxial with the valve and opening, a piston in said cylinder having a piston rod fixed to said valve, a closure spring for the valve, and a vent opening leading from the cylinder between the piston and closed end thereof to the atmosphere, said piston having a cup leather, and a spring-pressed tapered plug mounted on the piston rod and pressing the cup leather uniformly and tightly against the cylinder wall to prevent liquid in the inlet passage passing the piston and reaching the vent opening.

4. In a hose nozzle, having inlet and outlet passages separated by a partition located normal to the axis of the inlet passage and having an opening, a valve located in the inlet passage for closing said opening and having an actuating stem extending into the outlet passage and outside said body, a lever outside and pivoted to the body for actuating said stem, said body having an entrance opening for the inlet passage and a hub located in the inlet passage and circumferentially spaced from the wall thereof by one or more spider arms, said hub having an opening therethrough, all said openings being axially alined, the opening in said hub having a threaded portion and a tapered portion diverging from the threaded portion toward the entrance opening, a cylinder threaded into said threaded portion and having a tapered portion to be drawn into intimate contact with the tapered portion of the hole in the hub when the cylinder is screwed into place, said cylinder having a closed end adjacent the entrance opening and the other end being open, a piston in said cylinder having a piston rod fixed to said valve, a closure spring for said valve, and communicating vent openings one in said cylinder and one in a spider arm for connecting said cylinder at a point between its closed end and the piston to the atmosphere, said vent openings communicating intermediate the ends of said tapered portions, whereby to avoid leakage from the inlet passage to and through the vent openings.

ALFRED L. GRISÉ.